United States Patent
Won et al.

(10) Patent No.: US 7,787,454 B1
(45) Date of Patent: Aug. 31, 2010

(54) CREATING AND/OR MANAGING META-DATA FOR DATA STORAGE DEVICES USING A PACKET SWITCH APPLIANCE

(75) Inventors: King L. Won, San Jose, CA (US); Patrick Pak Tak Leong, Palo Alto, CA (US)

(73) Assignee: Gigamon LLC., Milpitas, CA (US)

( * ) Notice: Subject to any disclaimer, the term of this patent is extended or adjusted under 35 U.S.C. 154(b) by 267 days.

(21) Appl. No.: 11/933,239

(22) Filed: Oct. 31, 2007

(51) Int. Cl.
*H04L 12/28* (2006.01)

(52) U.S. Cl. ........................................ 370/389

(58) Field of Classification Search .............. 370/389, 370/395.41, 401
See application file for complete search history.

(56) References Cited

U.S. PATENT DOCUMENTS

| | | | |
|---|---|---|---|
| 2003/0118053 A1* | 6/2003 | Edsall et al. | 370/474 |
| 2003/0236774 A1* | 12/2003 | Andreev et al. | 707/3 |
| 2003/0236884 A1* | 12/2003 | Yamamoto et al. | 709/225 |
| 2003/0236945 A1* | 12/2003 | Nahum | 711/114 |
| 2005/0053073 A1* | 3/2005 | Kloth et al. | 370/395.41 |
| 2005/0254490 A1 | 11/2005 | Gallatin et al. | |
| 2005/0265248 A1 | 12/2005 | Gallatin et al. | |
| 2005/0265364 A1 | 12/2005 | Gallatin et al. | |
| 2005/0271065 A1* | 12/2005 | Gallatin et al. | 370/401 |

OTHER PUBLICATIONS

U.S.Appl. No. 11/796,001, filed Apr. 25, 2007, for Patrick P. Leong et al.

* cited by examiner

*Primary Examiner*—Ayaz R Sheikh
*Assistant Examiner*—Hai-Chang Hsiung
(74) *Attorney, Agent, or Firm*—Vista IP Law Group, LLP.

(57) ABSTRACT

A first instrument port of a packet switch appliance is connected to a first data storage device. A second port is configured as a first network port. A first meta-data tag is created for a first block of packets received through the first network port. The first block is sent to the first data storage device through the first instrument port. The first meta-data tag or copy is sent to the first data storage device and/or a storage management server. A second instrument port of the packet switch appliance is connected to a second data storage device. A second meta-data tag is created for a second block of packets received through the first network port. The second block is sent to the second data storage device through the second instrument port. The second meta-data tag or copy is sent to the second data storage device and/or the storage management server.

17 Claims, 5 Drawing Sheets

CREATING AND/OR MANAGING META-DATA FOR DATA STORAGE DEVICES USING A PACKET SWITCH APPLIANCE

BACKGROUND

1. Field

The present application relates generally to data storage devices; more specifically, this application relates to creating and/or managing meta-data for data storage devices using a packet switch appliance.

2. Related Art

In a packet-switching network, the transmission, routing, forwarding, and the like of messages between the terminals in the packet-switching network are broken into one or more packets. Typically, data packets transmitted or routed through the packet-switching network comprise three elements: a header, a payload, and a trailer. The header may comprise several identifiers such as source and destination terminal addresses, virtual local area network (VLAN) tag, packet size, packet protocol, and the like. The payload is the core data for delivery, other than header or trailer, which is being transmitted. The trailer typically identifies the end of the packet and may comprise error checking information. Data packets may conform to a number of packet formats such as IEEE 802.1D or 802.1Q.

Associated with each terminal in the packet-switching network is a unique terminal address. Each of the packets of a message has a source terminal address, a destination terminal address, and a payload, which contains at least a portion of the message. The source terminal address is the terminal address of the source terminal of the packet. The destination terminal address is the terminal address of the destination terminal of the packet. Further, each of the packets of a message may take different paths to the destination terminal, depending on the availability of communication channels, and may arrive at different times. The complete message is reassembled from the packets of the message at the destination terminal. One skilled in the art commonly refers to the source terminal address and the destination terminal address as the source address and the destination address, respectively.

A typical packet-switching network employs a packet switch appliance to forward packets within the network to their respective destination terminals. A packet switch appliance may also be employed as part of a network monitoring system of a packet-switching network. The typical packet-switching appliance may include a number of ports. A given port may be configured as a network port for connection to the packet-switching network. Alternatively, a port may be configured as an instrument port for connection to one or more network instruments such as packet sniffers, intrusion detection systems, intrusion prevention systems, forensic recorders, or data storage devices.

Packet traffic in a packet-switching network, or portions thereof, may be stored for later forensic analysis or use. However, a typical packet, with its format of header, payload, and trailer designed for bandwidth efficiency provides limited network information beyond the source and destination address of a given packet. Methods and systems that may provide additional information on packet traffic in a packet-switching network may provide useful information for later retrieval or use.

SUMMARY

In one exemplary embodiment, a first instrument port of a packet switch appliance is connected to a first data storage device. A second port is configured as a first network port. A first meta-data tag is created for a first block of packets received through the first network port. The first block is sent to the first data storage device through the first instrument port. The first meta-data tag or a copy is sent to the first data storage device and/or a storage management server with the port number of the first instrument port. A second instrument port of the packet switch appliance is connected to a second data storage device. A second meta-data tag is created for a second block of packets received through the first network port. The second block is sent to the second data storage device through the second instrument port. The second meta-data tag or a copy is sent to the second data storage device and/or the storage management server with the port number of the second instrument port.

DESCRIPTION OF DRAWING FIGURES

The present application can be best understood by reference to the following description taken in conjunction with the accompanying drawing figures, in which like parts may be referred to by like numerals:

DETAILED DESCRIPTION

The following description sets forth numerous exemplary configurations, parameters, and the like. It should be recognized, however, that such description is not intended as a limitation on the scope of the present invention, but is instead provided as a description of exemplary embodiments.

A. Network Configuration

Figure 1:
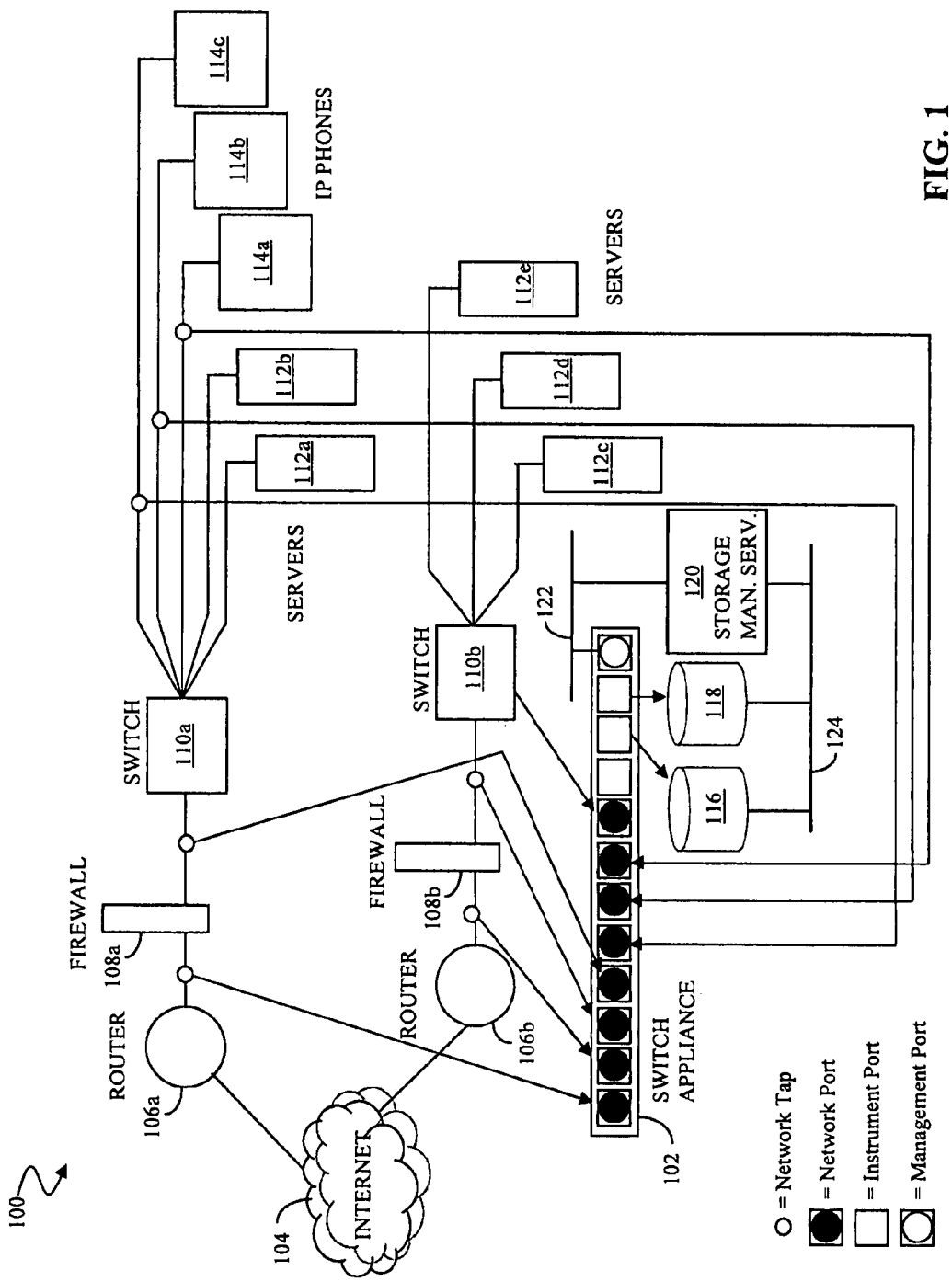
FIG. 1 illustrates an exemplary packet-switching network and a packet switch appliance.

With reference to FIG. 1, in one exemplary embodiment, a packet switch appliance 102 is integrated into a packet-switching network 100. The internet 104 can be connected via routers 106a and 106b and firewalls 108a and 108b to switches 110a and 110b. Switch 110a can also be connected to servers 112a and 112b and to IP phones 114a-c. Switch 110b can also be connected to servers 112c-e. Packet switch appliance 102 can be connected to various points of the network via network taps and tap ports on the packet switch appliance. Packet switch appliance 102 can also be connected to a variety of network instruments, such as data storage devices 116, 118 and storage management server 120. It should be recognized that the system depicted in FIG. 1 can include fewer components or more components than those depicted, and the connection of the packet switch appliance to the network may be varied.

In the embodiment of FIG. 1, because packet switch appliance 102 is connected to every device in the packet-switching network, the packet switch appliance has a global network footprint and may potentially access all data packets transmitted across the network. Consequently, packet switch appliance 102 is capable of forwarding any or all of the data packets transmitted across the network to data storage devices 116 and 118 for storage and later retrieval.

For the sake of simplicity, packet-switching network 100 is described below in the context of using an Ethernet format. It should be recognized, however, that packet-switching network 100 can use any desirable networking format, such as synchronous optical network (SONET), synchronous digital hierarchy (SDH), wide area network (WAN) protocol, Fiber Channel, and the like.

B. Packet Switch Appliance and Meta Data Creation

The packet switch appliance 102 of FIG. 1 includes a plurality of ports. Each port may be configured as a network port or tap port for connection to the network. Typically, a network port is connected to a network tap or switch of the network. A port of the packet switch appliance may also be configured as an instrument port, which is used for connecting to a network instrument. Packet switch appliance 102 also includes one or more management ports. Typically, an instrument port is limited to one-way traffic, while a management port permits two-way traffic.

In the embodiment of FIG. 1, data storage device 116 and data storage device 118 are connected to packet switch appliance 102 via instrument ports. Alternative or additional network instruments may include, but are not limited to, network monitoring instruments such as packet sniffers, intrusion detection systems, or the like. A port may also be configured as a transport port for connection between packet switch appliance 102 and another packet switch appliance. Typically, each port of the network switch appliance will have an associated port number or address for identifying the port.

In the embodiment of FIG. 1, storage management server 120 is connected to packet switch appliance 102 via a management port and to data storage devices 116, 118. In particular, storage management server 120 is depicted as being connected to the management port on packet switch appliance 102 through a network 122 and to data storage devices 116, 118 through a network 124. Thus, storage management server 120 and data storage devices 116, 118 can communicate together without necessarily having to communicate through packet switch appliance 102. In particular, as mentioned above, instrument ports are typically limited to one-way traffic. Thus, data storage devices 116, 118 can not communicate with storage management server 120 through the instrument ports on the packet switch appliance 102 to which they are connected. Instead, data storage devices 116, 118 can communicate with storage management server 120 through network 124, which allows for two-way traffic. Also, while storage management server 120 could communicate with data storage devices 116, 118 through the management port on the packet switch appliance 102 to which it is connected, it may be preferable in some circumstances for storage management server 120 to communicate with data storage devices 116, 118 through network 122 rather add traffic on packet switch appliance 102 by using the management port.

In the present exemplary embodiment, network 122 and network 124 are separate from network 100. Network 122 and/or network 124 can be a private or public network. Network 122 can also be a dedicated or non-dedicated network. Network 122 and network 124 can be connected together as a single network. Also, storage management server 120 can be directly connected to packet switch appliance 102 and/or to data storage devices 116, 118.

Packet switch appliance 102 is capable of forwarding received network packet traffic to data storage devices 116 and 118. The packet switch appliance may forward the packet traffic with or without generating meta-data relating to the forwarded packet traffic data. Meta-data is understood to be any data that provides data about other data, such as the forwarded packet traffic. Meta-data includes, but is not limited to, data concerning the source, destination, time of transmission or receipt, or content of a packet or block of packets. In the instances when meta-data is generated, it may be forwarded to the same destination as the packet traffic, or the meta-data may be forwarded to an alternative destination. Generation of meta-data may be useful in a system employing distributed storage, in which packet data may be stored on more than one data storage device. Meta-data and distributed storage may also be useful in a system in which system resources during retrieval operations may be limited, whereas system resources during storage operations are available.

Figure 2:
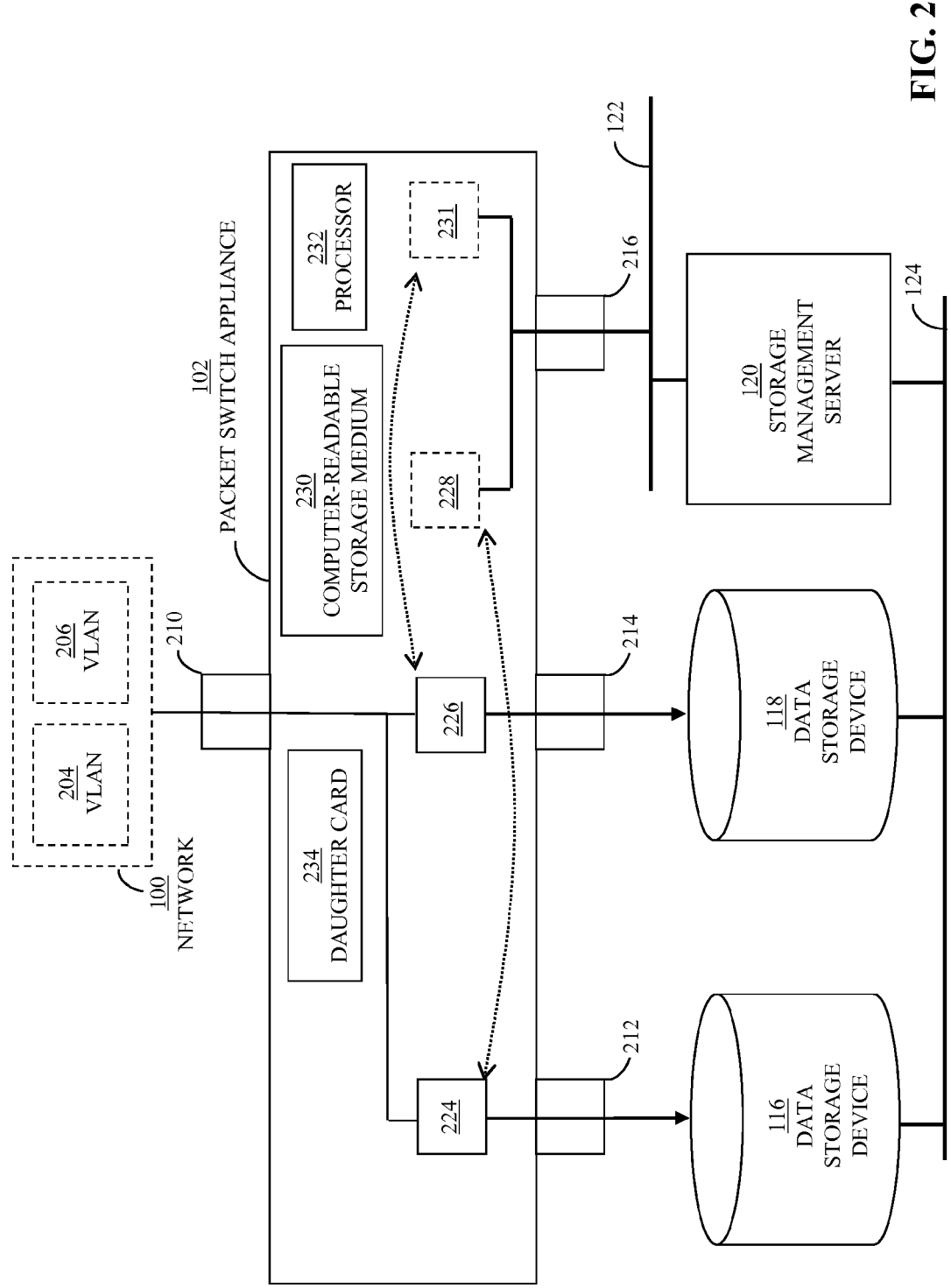
FIG. 2 illustrates an exemplary distributed packet storage system.

As depicted in FIG. 2, packet switch appliance 102 includes a computer-readable storage medium 230, one or more processor units 232, and a daughter card 234. As described below, computer-readable storage medium 230 can include computer-executable instructions to control the operation of packet switch appliance 102. One or more processor units 232 can execute the instructions stored on computer-readable storage medium 230. One or more processor units 232 can be configured to perform packet analysis, packet traffic analysis, and meta-data generation. One or more processor units 232 may each be a general purpose processor, a FPGA (field programmable gate array), NPU (network processor unit), multi-core processor, multi-core packet processor, ASIC (application specific integrated circuit), or the like.

Daughter card 234 can include one or more processing units to perform packet analysis, packet traffic analysis, and meta-data generation. The one or more processing units on daughter card 234 can also perform packet modification functions such as packet slicing and packet regeneration based on header, payload, trailer, or other packet information. The one or more processor units on daughter card 234 may each be a general purpose processor, an FPGA, NPU, multi-core processor, multi-core packet processor, ASIC, or the like. For a more detailed description of packet modification functions and additional packet switch appliance hardware, see U.S. patent application Ser. No. 11/796,001, filed on Apr. 25, 2007, which is incorporated herein by reference in its entirety for all purposes.

It should be recognized that packet switch appliance 102 may be configured with additional hardware and/or software and may be capable of additional operations. The packet switch appliance may be configured to perform a number of packet distribution and handling functions such as one-to-one, one-to-many, many-to-one, and many-to-many port distributing, filtering, flow-based streaming, and load balancing. For a more detailed description of these features, see U.S. patent application Ser. Nos. 11/123,273; 11/123,377; 11/123,465; and 11/123,729, all of which were filed on May 5, 2005, and which are all incorporated herein by reference in their entireties for all purposes.

C. Managing Meta-Data

FIG. 2 depicts a system for the distributed storage of packet traffic from packet switched network 100 received by packet switch appliance 102. The system of FIG. 2 can operate as a distributed data storage system: packet traffic from network 100 intended for storage is forwarded by packet switch appliance 102 to an array of data storage devices for archiving and, potentially, later retrieval. For example, FIG. 2 depicts packet switch appliance 102 connected to data storage devices 116 and 118. It should be recognized, however; that packet switch appliance 102 can be connected to any number of data storage devices.

Distributed data storage may provide a number of benefits. Hardware limitations, such as disk write times, may be overcome by distributing the write tasks across a number of instruments. Similarly, single port bandwidth limitations may be overcome by distributing data flow from the packet switch appliance to the array of data storage devices over an array of instrument ports. Upon data retrieval, read operations may realize similar benefits from distributed storage. Physical segregation may also be achieved in that a designated subset of network traffic may be stored on one data storage device while another subset is stored on a separate device, in the same or separate locations.

Figure 3:
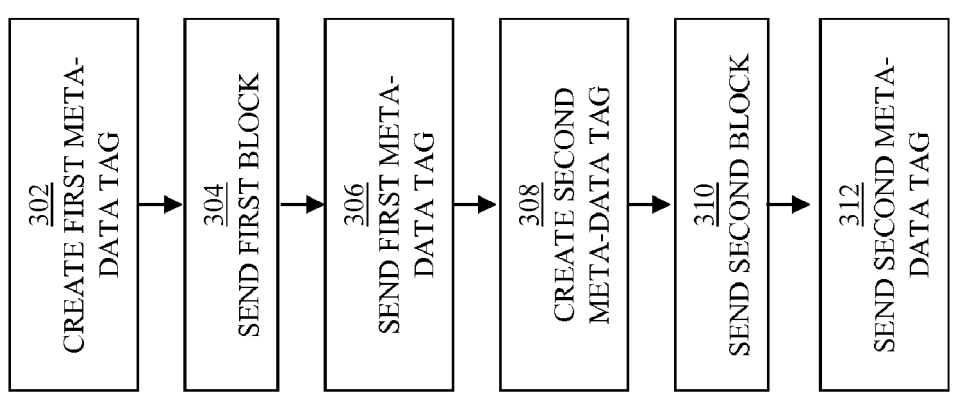
FIG. 3 is a flow chart of an exemplary process of managing meta-data for data storage devices.

FIG. 3 depicts an exemplary process of managing meta-data for data storage devices using the packet switch appliance. It should be recognized that the exemplary process depicted in FIG. 3 can be implemented as instructions stored on a computer-readable storage medium in the packet switch appliance. For example, in FIG. 2, the instructions can be stored on computer-readable medium 230. Processor 232 can execute the instructions stored on computer-readable medium 230.

A first port on the packet switch appliance is configured to operate as a first instrument port connected to a first data storage device. As described above, ports of the first data storage device are associated with port numbers. A second port on the packet switch appliance is configured as a first network port connected to the packet-switching network. For example, in FIG. 2, port 212 on packet switch appliance 102 is configured to operate as a first instrument port connected to data storage device 116. Assume for the sake of example that port 212 is associated with port number 1. It should be recognized that this association is a logical association. Port 210 on packet switch appliance 102 is configured as a first network port connected to packet-switching network 100.

With reference to FIG. 3, in step 302, when a first block of one or more packets is received from the packet-switching network through the first network port, a first met-data tag is created for the first block. The first block may include one or more packets that may be modified by the packet switch appliance prior to storage. Packet modification may include, but is not limited to, additions or deletions to components of a packet, such as packet slicing or packet time stamping. For example, it may be found useful to store only the payload or header of packets in a block of packets. The meta-data tag created for the block may provide information about the block of packets such as data concerning the source, destination, time of transmission or receipt, or content of a packet or block of packets. The meta-data tag may also include data concerning the payload of packets in the block.

For example, FIG. 2 depicts block 224 received from packet-switching network 100 through port 210. Meta-data tag 228 is created for block 224.

With reference again to FIG. 3, in step 304, the first block of one or more packets is sent to the first data storage device through the first instrument port. For example, in FIG. 2, block 224 is sent to data storage device 116 through port 212.

With reference again to FIG. 3, in step 306, the first meta-data tag or a copy of the first meta-data tag is sent. In one exemplary embodiment, the first meta-data tag or a copy of the first meta-data tag is sent to data storage device 116. In another exemplary embodiment, the first meta-data tag or a copy of the first meta-data tag is sent to a storage management server. The first meta-data tag or the copy of the first meta-data tag is sent to the storage management server with the port number associated with the first instrument port, which was the port through which the first block was sent to the first data storage device.

Note, if the meta-data tag is sent to data storage device 116, then a copy of the first meta-data tag is sent to the storage management server. Alternatively, if a copy of the first meta-data tag is sent to data storage device 116, then the meta-data tag or another copy of the first meta-data tag is sent to the storage management server.

For example, in FIG. 2, storage management server 120 is connected to packet switch appliance 102 through management port 216. Meta-data tag 228 or a copy of meta-data tag 228 is sent to storage management server 120 through management port 216. Assume that port 212 is associated with port number 1. Thus, meta-data tag 228 or copy of meta-data tag 228 includes port number 1. Meta-data tag 228 or copy of meta-data tag 228 can also include information about what types of packets are in block 224, IP addresses (such as source and destination IP addresses, source and destination MAC addresses, source and destination app ports, etc.), MAC addresses (such as special multicast MAC addresses, specific MAC addresses of servers or honey pots, etc.), protocol types, a unique identification for packet switch appliance 102 (such as a unique system serial number), one or timestamps on when block 224 first started to fill and when block 224 became full or closed, the size of block 224, etc. Meta-data tag 228 or copy of meta-data tag 228 can also include various other types of information, such as names of any switch and span ports that are sourcing the data to packet switch appliance 102.

It should be recognized that some of the information in meta-data tag 228 or copy of meta-data tag 228 may not be directly extractable from the packets. The user can configure such information to packet switch appliance 102, such as the information about which span port is sending data to network port 210.

In the present exemplary embodiment, a third port on the packet switch appliance is configured to operate as a second instrument port connected to a second data storage device. For example, in FIG. 2, port 214 on packet switch appliance 102 is configured to operate as a second instrument port connected to data storage device 118. Assume for the sake of example that port 214 is associated with port number 2.

With reference again to FIG. 3, in step 308, when a second block of one or more packets is received from the packet-switching network through the first network port, a second met-data tag is created for the second block. For example, FIG. 2 depicts block 226 received from packet-switching network 100 through port 210. Meta-data tag 231 is created for block 226.

With reference again to FIG. 3, in step 310, the second block of one or more packets is sent to the second data storage device through the second instrument port. For example, in FIG. 2, block 226 is sent to data storage device 118 through port 214.

With reference again to FIG. 3, in step 312, the second meta-data tag or a copy of the second meta-data tag is sent. In one exemplary embodiment, the second meta-data tag or a copy of the second meta-data tag is sent to data storage device 118. In another exemplary embodiment, the second meta-data tag or the copy of the second meta-data tag is sent to a storage management server. The second meta-data tag or the copy of the second meta-data tag is sent to a storage management server with the port number associated with the second instrument port, which was the port through which the second block was sent to the second data storage device.

Note, if the meta-data tag is sent to data storage device 118, then a copy of the first meta-data tag is sent to the storage management server. Alternatively, if a copy of the first meta-data tag is sent to data storage device 118, then the meta-data tag or another copy of the first meta-data tag is sent to the storage management server.

For example, in FIG. 2, meta-data tag 231 or copy of meta-data tag 231 is sent to storage management server 120 through management port 216. Assume that port 214 is associated with port number 2. Again, it should be recognized that this associate is a logical association. Thus, meta-data tag 231 or copy of meta-data tag 231 includes port number 2. Meta-data tag 231 or copy of meta-data tag 231 can also include information about what types of packets are in block 226, IP addresses (such as source and destination IP addresses, source and destination MAC addresses, source and destination app ports, etc.), MAC addresses (such as special multi-cast MAC addresses, specific MAC addresses of servers or honey pots, etc.), protocol types, a unique identification for packet switch appliance 102 (such as a unique system serial number, one or timestamps on when block 226 first started to fill and when block 226 became full or closed, the size of block 226, etc. Meta-data tag 231 or copy of meta-data tag 231 can also include various other types of information, such as names of any switch and span ports that are sourcing the data to packet switch appliance 102.

It should be recognized that some of the information in meta-data tag 231 or copy of meta-data tag 231 may not be directly extractable from the packets, but the user can configure such information to packet switch appliance 102. For example, the information about which span port is sending data to network port 210.

In one exemplary embodiment, another port on packet switch appliance 102 can be configured to operate as a second network port connected to network 100. When a third block of one or more packets is received through the second network port, a third meta-data tag can be created for the third block. The third block is sent to first data storage device 116 through the first instrument port. The third meta-data tag or a copy of the third meta-data tag is sent to storage management server 120 with the port number associated with the first instrument port. When a fourth block of one or more packets is received through the second network port, a fourth meta-data tag can be created for the fourth block. The fourth block is sent to second data storage device 116 through the second instrument port. The fourth meta-data tag or a copy of the fourth meta-data tag is sent to storage management server 120 with the port number associated with the second instrument port. It should be recognized that packet switch appliance 102 can include any number of ports configured to operate as network ports.

In one exemplary embodiment, packet switch appliance 102 can be used to filter and/or parse packets received from the packet-switching network through the first network port using one or more criteria. In one implementation, a filter associated with network port 210 can filter packets into one or more blocks. The filter can also tag the filtered packets with information bits, which can be used to create meta-data tags. The meta-data tags can then be appended to the one or more blocks. In another implementation, the filter can filter the packets into one or more blocks without tagging the filtered packets. The filtered packets are parsed based on one or more criteria to create meta-data tags. The meta-data tags can then be appended to the one or more blocks. In still another implementation, the filter can filter the packets into one or more blocks, and also tag the filtered packets. Meta-data tags can be created using the tags. The filtered packets can then be further parsed based on one or more criteria to create meta-data tags. The meta-data tags are appended to the one or more blocks.

The one or more criteria can include a VLAN identification of the packet, source address, destination address, type of data, etc. Thus, in one exemplary embodiment, packet switch appliance 102 can be used in managing data received from virtual local area networks. For example, FIG. 2 depicts VLANs 204 and 206. Each VLAN can be a logical association of similar devices: IP phones, servers, and workstations, respectively. Each VLAN can also be a logical association of users that may or may not be physically associated. Block 224 can include all packets associated with VLAN 204 received in a specified time period if block 224 has not filled up by the end of that time period. For example, when VLAN 204 includes all IP phones, block 224 would include all IP phone-associated packets trafficking on network 100 for the specified time period. Similar, block 226 can include all packets associated with VLAN 206 received in a specified time period if block 226 has not filled up by the end of that time period. For example, when VLAN 206 includes all servers, block 226 would include all server-associated packets trafficking on network 100 for the specified time period.

Figure 4:
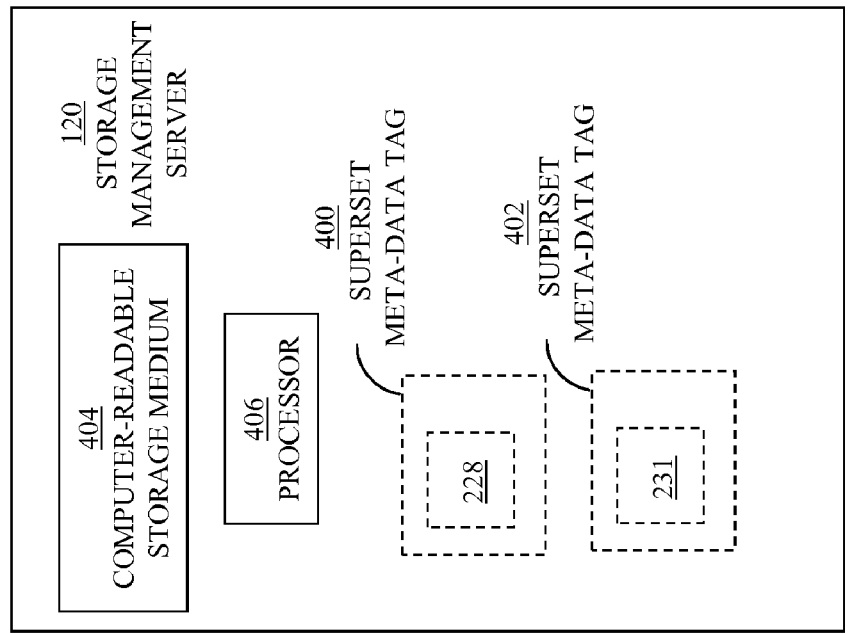
FIG. 4 illustrates an exemplary storage management server for use in distributed packet storage system.
Figure 5:
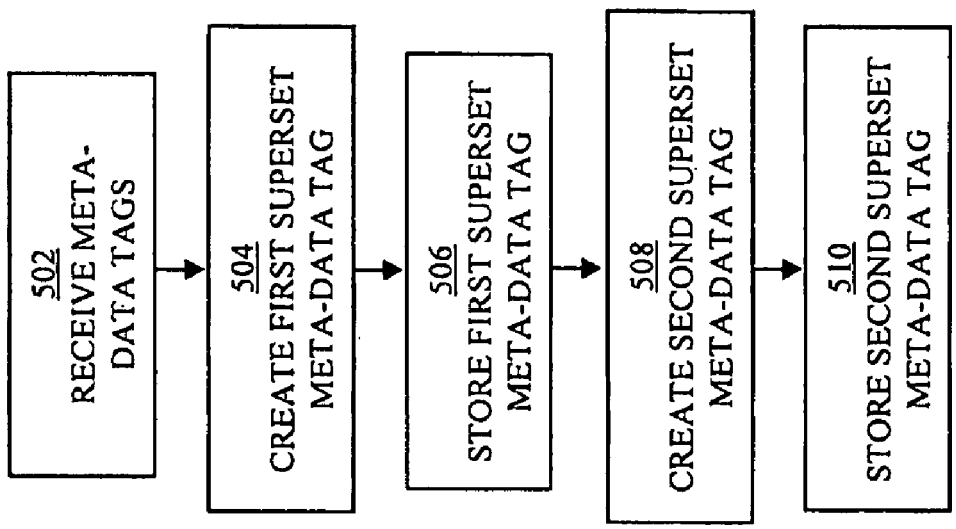
FIG. 5 is a flow chart of an exemplary process of storing meta-data on the storage management server of FIG. 4.

FIG. 5 depicts an exemplary process of storing meta-data on the storage management server. It should be recognized that the exemplary process depicted in FIG. 5 can be implemented as instructions stored on a computer-readable storage medium in the packet switch appliance. For example, in FIG. 4, the instructions can be stored on computer-readable medium 404 of storage management server 120. Processor 406 can execute the instructions stored on computer-readable medium 404.

With reference again to FIG. 5, in step 502, the first and second meta-data tags or copies of the first and second meta-data tags are received. In step 504, a first superset meta-data tag is created for the first meta-data tag or copy of the first meta-data tag. In step 506, the first superset meta-data tag is stored. In step 508, a second superset meta-data tag is created for the second meta-data tag or copy of the second meta-data tag. In step 510, the second superset meta-data tag is stored. For example, in FIG. 4, superset meta-data tag 400 is generated for meta-data tag 228. Superset meta-data tag 402 is generated for meta-data tag 231. It should be recognized that a superset meta-data tag can be created for any number of meta-data tags.

A superset meta-data tag can include information, such as unique identifications for the data storage devices attached to the instrument ports of the packet switch appliance, identifications of network devices or elements that are the sources of packets received from the packet-switching network through the instrument port of the packet switch appliance, etc.

Figure 6:
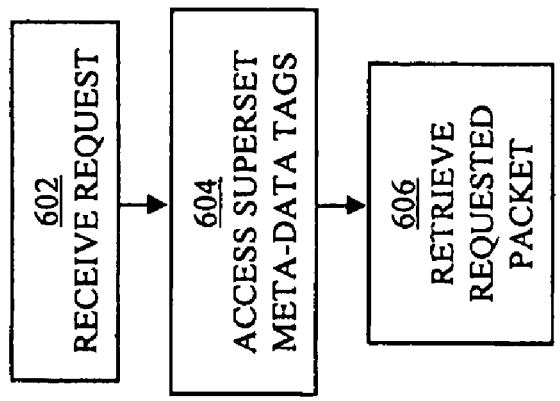
FIG. 6 is a flow chart of an exemplary process of retrieving a packet using the storage management server of FIG. 4.

A superset meta-data tag can be used to facilitate a request for a packet or packets. FIG. 6 depicts an exemplary process of retrieving a packet using the superset meta-data tags generated by the storage management server. It should be recognized that the exemplary process depicted in FIG. 6 can be implemented as instructions stored on a computer-readable storage medium in the packet switch appliance. For example, in FIG. 4, the instructions can be stored on computer-readable medium 404 of storage management server 120. Processor 406 can execute the instructions stored on computer-readable medium 404.

With reference again to FIG. 6, in step 602, a request for a packet or packets meeting one or more criteria is received. In step 604, the superset meta-data tags are accessed to identify a meta-data tag or copy of a meta-data tag associated with a block of one or more packets with data satisfying the one or more criteria. In step 606, the requested packet is retrieved using the port number obtained from the identified meta-data tag or copy of the first meta-data tag.

In one exemplary embodiment, the association between port numbers and unique identifications for data storage devices is stored. For example, with reference to FIG. 2, an association between the port number of instrument port 212 and the unique identification for data storage device 116 is stored. An association between the port number of instrument port 214 and the unique identification for data storage device 118 is stored. The unique identification for a data storage device can include model number, serial number input port number, NIC's ID, storage capacity, connect and disconnect time with the port on packet switch appliance 102, etc.

The stored association between port numbers and unique identifications for data storage devices can be used in retrieving the requested packet. In particular, as described below with reference to step 606 (FIG. 6), the requested packet is retrieved using the port number obtained from the identified meta-data tag or copy of the first meta-data tag. The stored association between port numbers and unique identifications can be used to identify the unique identification for the data storage device associated with the port number obtained from the identified meta-data tag or copy of the first meta-data tag in step 606 (FIG. 6). The unique identification number for the data storage device can then be used to retrieve the requested packet from the data storage device. For example, with reference to FIG. 2, once the unique identification number for data storage device 116 or 118 is known, storage management server 120 can communicate with data storage device 116 or 118 through network 124 to retrieve the requested packet from data storage device 116 or 118.

The association between port numbers and unique identifications for data storage devices can be stored at various locations. For example, the association can be stored at packet switch appliance 102, storage management server 120, or another device that is accessible to storage management server 120. If the association between port numbers and data storage devices changes, the stored association is updated. For example, if instrument port 214 is connected to a data storage device other than data storage device 118, then the stored association between port numbers and unique identifications for data storage devices is updated to reflect that new association between the port number of instrument port 214 and the new data storage device.

With reference again to FIG. 2, in one exemplary embodiment, the distributed packet storage system can be configured with availability or performance assessment, and/or performance compensation capabilities. For example, data storage devices 116 and 118 may be configured with logic and/or hardware for detecting a reduction in availability or performance, such as a reduction in storage capacity, resource availability, or storage performance. Data storage devices 116 and 118 can also be configured to send a command to storage management server 120, which will then communicate any desired changes to packet switch appliance 102 upon detection of a predetermined level of reduction in availability or performance.

In one exemplary embodiment, upon receiving a signal of reduced availability or performance from storage management server 120 and appropriate commands, packet switch appliance 102 can be configured to re-route blocks of packets designated for the data storage device to another data storage device. For example, assume a signal of reduced availability or performed is received from data storage device 116 by storage management server 120, storage management server 120 can command packet switch appliance 102 to re-route blocks of packets designated for data storage device 116 to data storage device 118.

In one exemplary embodiment, packet switch appliance 102 can be configured by storage management server 120 to continue re-routing blocks designated for one data storage device until the data storage device sends a command to storage management server 120 to restore block routing to that data storage device. In another exemplary embodiment, the packet switch appliance 102 or storage management server 120 can be configured to poll data storage devices 116 and 118 at intervals to determine availability or performance of the data storage devices.

In one exemplary embodiment, performance in the distributed packet storage system can also be assessed via timestamping. For example, packet switch appliance 102 can generate a time stamp packet when a block of packets is first received by packet switch appliance 102. A second timestamp packet is generated by packet switch appliance 102 prior to sending the block of packets through an instrument port. Thus, two time stamped packets, separated by a time interval, are generated.

Performance at various points in the system of FIG. 2 may be assessed based on a comparison of the timestamps. For example, performance of packet switch appliance 102 can be assessed by analyzing the time from packet receipt to packet forwarding using the two time stamped packets described above. The performance of data storage device 116 can be assessed by analyzing the time interval between the storage of the first time stamped packet and the second time stamped packet.

Figure 7:
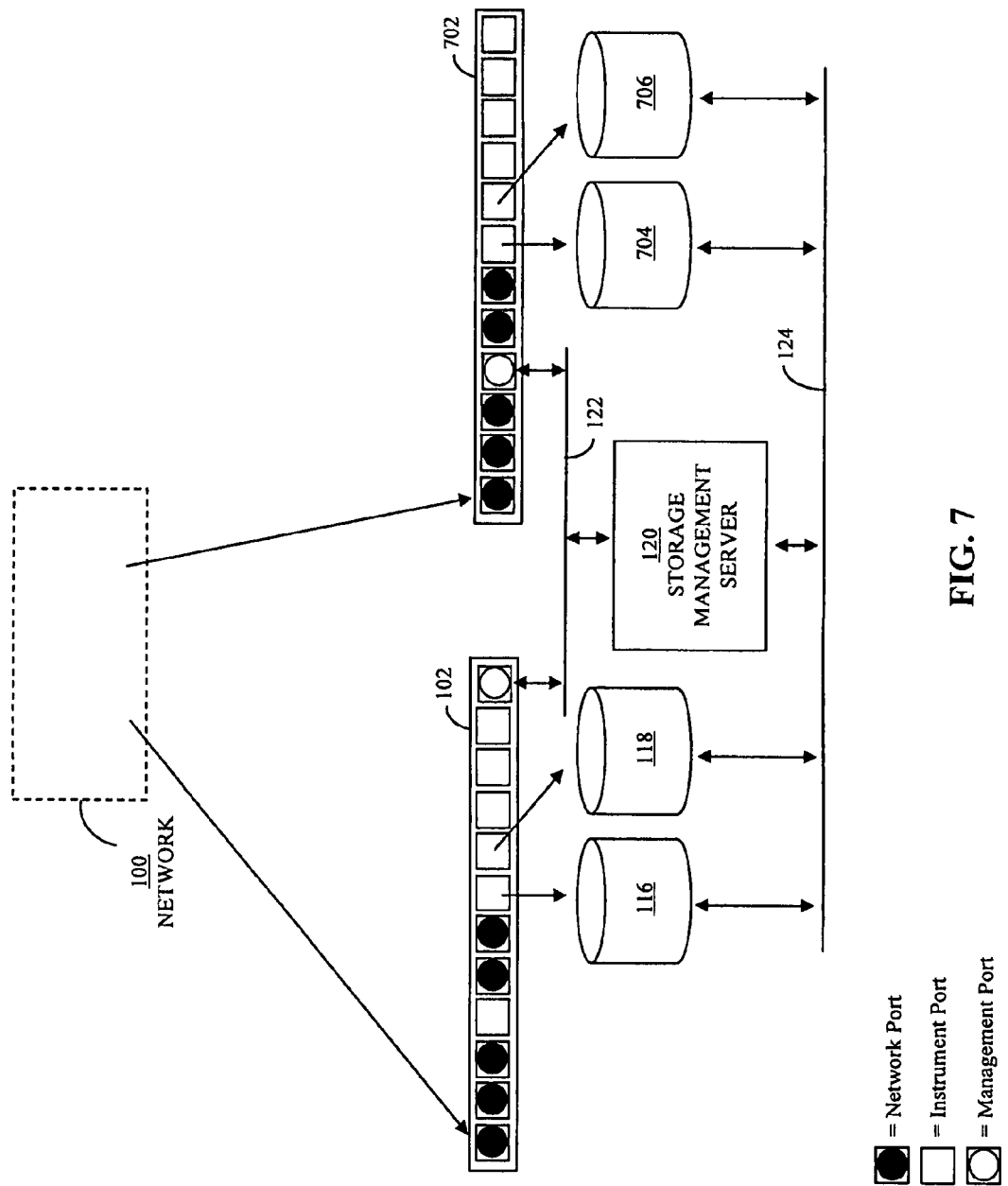
FIG. 7 illustrates an exemplary distributed packet storage system using multiple packet switch appliances.

In one exemplary embodiment, multiple packet switch appliances, as described herein, may be employed in a distributed packet storage system. For example, FIG. 7 depicts a distributed packet storage system with packet switch appliances 102 and 702. It should be recognized, however, that the distributed packet storage system can include any number of packet switch appliances.

Similar to packet switch appliance 102, packet switch appliance 702 can be configured to create and manage meta-data for data storage devices. In particular, a first port on packet switch appliance 702 can be configured to operate as a first instrument port connected to data storage device 704. A second port on packet switch appliance 702 can be configured to operate as second instrument port connected to data storage device 706. It should be recognized that packet switch appliance 702 can be connected to any number of data storage devices.

A third port on packet switch appliance 702 can be configured to operate as a first network port connected to packet-switching network 100. When a block of one or more packets is received from packet-switching network 100 through the first network port on packet switch appliance 702, a meta-data tag for the block is created. The block of one or more packets is sent to data storage device 704 through the first instrument port. The meta-data tag or a copy of the meta-data tag is sent to storage management server 120. The meta-data tag or the copy of the meta-data tag includes the port number associated with the first instrument port through which the block was sent to data storage device 704.

Note, the original meta-data tag can be included in the block of one or more packets sent to data storage device 704, and the copy of the meta-data tag can be sent to storage management server 120. Alternatively, the original meta-data tag can be sent to storage management server 120, and the copy of the meta-data tag can be included in the block of one or more packets sent to data storage device 704. As another alternative, the copy of the meta-data tag can be sent to storage management server 120, and another copy of the meta-data tag can be included in the block of one or more packets sent to data storage device 704.

As depicted in FIG. 7, storage management server 120 and packet switch appliances 102, 702 can be connected through network 122. In particular, storage management server 120 is connected to network 122, and packet switch appliances 102 and packet switch appliance 702 are connected to network 122 through management ports on the packet switch appliance.

In one exemplary embodiment, different packet switch appliances can be assigned to handle different sets of packets from network 100. For example, in FIG. 7, packet switch appliance 102 can be assigned to handle a first set of packets from network 100, such as those associated with a first VLAN, and packet switch appliance 702 can be assigned to handle a second set of packets from network 100, such as those associated with a second VLAN. It should be recognized that any number of packet switch appliances can be assigned to any number of different set of packets.

In one exemplary embodiment, each packet switch appliance can be assigned a unit number. The meta-data tag or copy of the meta-data tag sent from the packet switch appliance can include the unit number of the packet switch appliance. For example, in FIG. 7, packet switch appliance 102 can be assigned 1 as a unit number. Thus, the meta-data tag or copy of the meta-data tag sent from packet switch appliance 102 to storage management server 120 includes unit number 1. Packet switch appliance 702 can be assigned 2 as a unit number. Thus, the meta-data tag or copy of the meta-data tag sent from packet switch appliance 702 to storage management server 120 includes unit number 2.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention.

We claim:

1. A method of creating and/or managing meta-data for data storage devices using a first packet switch appliance having a plurality of ports associated with port numbers, wherein a first port on the first packet switch appliance is configured to operate as a first instrument port connected to a first data storage device, a second port on the first packet switch appliance is configured as a first network port connected to a packet-switching network, a third port on the first packet switch appliance is configured to operate as a second instrument port connected to a second data storage device, and a fourth port on the first packet switch appliance is a management port connected to a storage management server, the method comprising:

when a first block of one or more packets is received from the packet-switching network through the first network port:
creating a first meta-data tag for the first block at the first packet switch appliance;
sending the first block of one or more packets to the first data storage device through the first instrument port; and
sending the first meta-data tag or a copy of the first meta-data tag to the first data storage device; and
when a second block of one or more packets is received from the packet-switching network through the first network port:
creating a second meta-data tag for the second block at the first packet switch appliance;
sending the second block of one or more packets to the second data storage device through the second instrument port; and
sending the second meta-data tag or a copy of the second meta-data tag to the second data storage device:
sending the first meta-data tag or the copy of the first meta-data tag to the storage management server, wherein the first meta-data tag or the copy of the first meta-data tag sent to the storage management server includes the port number associated with the first instrument port; and
sending the second meta-data tag or the copy of the second meta-data tag to the storage management server, wherein the second meta-data tag or the copy of the second meta-data tag sent to the storage management server includes the port number associated with the second instrument port;
wherein the first meta-data tag or the copy of the first meta-data tag, and the second meta-data tag or the copy of the second meta-data tag, are sent to the storage management server so that the storage management server can perform the acts of:
receiving the first and second meta-data tags or copies of the first and second meta-data tags;
creating a first superset meta-data tag for the first meta-data tag or the copy of the first meta-data tag, wherein the first superset meta-data tag include an association between the port number associated with the first instrument port and a unique identification for the first data storage device;
storing the first superset meta-data tag;
creating a second superset meta-data tag for the second meta-data tag or the copy of the second meta-data tag, wherein the second superset meta-data tag include an association between the port number associated with the second instrument port and a unique identification for the second data storage device; and
storing the second superset meta-data tag.

2. The method of claim 1, wherein the first meta-data tag is created by filtering the one or more packets received through the first network port, applying tags to the filtered one or more packets, and creating the first meta-data tag based on the applied tags, and wherein the method further comprises appending the first meta-data tag to the first block.

3. The method of claim 1, wherein the first meta-data tag is created by filtering the one or more packets received through the first network port, and parsing the filtered one or more packets based on one or more criteria to create the first meta-data tag, wherein the method further comprises appending the first meta-data tag to the first block.

4. The method of claim 1, wherein the first meta-data tag is created by filtering the one or more packets received through the first network port, applying tags to the filtered one or more packets, parsing the filtered one or more packets based on one or more criteria, and creating the first meta-data tag based on the applied tags, wherein the method further comprises appending the first meta-data tag to the first block.

5. The method of claim 1, wherein a fourth port on the first packet switch appliance is configured as a second network port connected to the packet-switching network, and wherein the method further comprises:

when a third block of one or more packets is received from the packet-switching network through the second network port:
creating a third meta-data tag for the third block;

sending the third block of one or more packets to the first data storage device through the first instrument port; and sending the third meta-data tag or a copy of the third meta-data tag to the first data storage device; and when a fourth block of one or more packets is received from the packet-switching network through the second network port:

creating a fourth meta-data tag for the fourth block;

sending the fourth block of one or more packets to the second data storage device through the second instrument port; and sending the fourth meta-data tag or a copy of the fourth meta-data tag to the second data storage device.

6. The method of claim 1, further comprising:

storing the association between the port number of the first instrument port and the unique identification for the first data storage device; and storing the association between the port number of the second instrument port and the unique identification for the second data storage device.

7. The method of claim 1, further comprising:

at the storage management server:

when a reduction in availability or performance of the first data storage device is detected, sending a command to the first packet switch appliance to reroute packets that are to be sent to the first data storage device through the first instrument port to the second data storage device through the second instrument port.

8. The method of claim 7, further comprising:

at the storage management server:

polling the first and second data storage devices to determine the availability or the performance of the first storage device, and availability or performance of the second data storage device.

9. The method of claim 1, wherein a first port on a second packet switch appliance is configured to operate as a first instrument port connected to a third data storage device, wherein a second port on the second packet switch appliance is configured as a first network port connected to the packet-switching network, wherein a third port on the second packet switch appliance is a management port connected to the storage management server, and wherein the first instrument port of the second packet switch is associated with a port number, the method further comprising:

when a third block of one or more packets is received from the packet-switching network through the first network port of the second packet switch appliance:

creating a third meta-data tag for the third block;

sending the third block of one or more packets to the third data storage device through the first instrument port of the second packet switch; and sending the third meta-data tag or a copy of the third meta-data tag to the storage management server, wherein the third meta-data tag or the copy of the third meta-data tag sent to the storage management server includes the port number associated with the first instrument port of the second packet switch.

10. The method of claim 9, further comprising:

assigning a first unit number to the first packet switch appliance, wherein the first meta-data tag or the copy of the first meta-data tag includes the first unit number of the first packet switch appliance; and assigning a second unit number to the second packet switch appliance, wherein the third meta-data tag or the copy of the third meta-data tag includes the second unit number of the second packet switch appliance, wherein the first and second unit numbers are different.

11. The method of claim 1, wherein a fifth port on the first packet switch appliance is configured to operate as a second network port, and wherein the method further comprises:

when a third block of one or more packets is received from the packet-switching network through the second network port:

creating a third meta-data tag for the third block;

sending the third block of one or more packets to the first data storage device through the first instrument port; and sending the third meta-data tag or a copy of the third meta-data tag to the storage management server, wherein the third meta-data tag or the copy of the third meta-data tag sent to the storage management server includes the port number associated with the first instrument port; and when a fourth block of one or more packets is received from the packet-switching network through the second network port:

creating a fourth meta-data tag for the fourth block;

sending the fourth block of one or more packets to the second data storage device through the second instrument port; and sending the fourth meta-data tag or a copy of the fourth meta-data tag to the storage management server, wherein the fourth meta-data tag or the copy of the fourth meta-data tag sent to the storage management server includes the port number associated with the second instrument port.

12. The method of claim 1, wherein the plurality of ports includes the first port, the second port, and the third port.

13. A method of creating and/or managing meta-data for data storage devices using a first packet switch appliance having a plurality of ports associated with port numbers, wherein a first port on the first packet switch appliance is configured to operate as a first instrument port connected to a first data storage device, wherein a second port on the first packet switch appliance is configured as a first network port connected to a packet-switching network, wherein a third port on the first packet switch appliance is configured to operate as a second instrument port connected to a second data storage device, and wherein a fourth port on the first packet switch appliance is a management port connected to a storage management server, the method comprising:

when a first block of one or more packets is received from the packet-switching network through the first network port:

creating a first meta-data tag for the first block at the first packet switch appliance;

sending the first block of one or more packets to the first data storage device through the first instrument port; and sending the first meta-data tag or a copy of the first meta-data tag to the storage management server, wherein the first meta-data tag or the copy of the first meta-data tag sent to the storage management server includes the port number associated with the first instrument port; and when a second block of one or more packets is received from the packet-switching network through the first network port:

creating a second meta-data tag for the second block at the first packet switch appliance;

sending the second block of one or more packets to the second data storage device through the second instrument port; and sending the second meta-data tag or a copy of the second meta-data tag to the storage management server, wherein the second meta-data tag or the copy of the second meta-data tag sent to the storage management server includes the port number associated with the second instrument port;

wherein the second meta-data tag or the copy of the second meta-data tag is sent to the storage management server so that the storage management server can perform the acts of:

receiving the first and second meta-data tags or the copies of the first and second meta-data tags;

creating a first superset meta-data tag for the first meta-data tag or the copy of the first meta-data tag;

storing the first superset meta-data tag;

creating a second superset meta-data tag for the second meta-data tag or the copy of the second meta-data tag; and storing the second superset meta-data tag.

14. The method of claim 13, further comprising:

storing an association between the port number of the first instrument port and a unique identification for the first data storage device; and storing an association between the port number of the second instrument port and a unique identification for the second data storage device.

15. The method of claim 13, wherein a first port on a second packet switch appliance is configured to operate as a first instrument port connected to a third data storage device, wherein a second port on the second packet switch appliance is configured as a first network port connected to the packet-switching network, wherein a third port on the second packet switch appliance is a management port connected to the storage management server, and wherein the first instrument port is associated with a port number, and wherein the method further comprises:

when a third block of one or more packets is received from the packet-switching network through the first network port of the second packet switch appliance:

creating a third meta-data tag for the third block;

sending the third block of one or more packets to the third data storage device through the first instrument port of the second packet switch appliance; and sending the third meta-data tag or a copy of the third meta-data tag to the storage management server, wherein the third meta-data tag or the copy of the third meta-data tag sent to the storage management server includes the port number associated with the first instrument port of the second packet switch appliance.

16. The method of claim 13, wherein a fifth port on the first packet switch appliance is configured to operate as a second network port, and wherein the method further comprises:

when a third block of one or more packets is received from the packet-switching network through the second network port:

creating a third meta-data tag for the third block;

sending the third block of one or more packets to the first data storage device through the first instrument port; and sending the third meta-data tag or a copy of the third meta-data tag to the storage management server, wherein the third meta-data tag or the copy of the third meta-data tag sent to the storage management server includes the port number associated with the first instrument port; and when a fourth block of one or more packets is received from the packet-switching network through the second network port:

creating a fourth meta-data tag for the fourth block;

sending the fourth block of one or more packets to the second data storage device through the second instrument port; and sending the fourth meta-data tag or a copy of the fourth meta-data tag to the storage management server, wherein the fourth meta-data tag or the copy of the fourth meta-data tag sent to the storage management server includes the port number associated with the second instrument port.

17. The method of claim 13, wherein the plurality of ports includes the first port, the second port, and the third port.

* * * * *